(12) United States Patent
Chen

(10) Patent No.: US 8,438,445 B2
(45) Date of Patent: May 7, 2013

(54) METHODS AND SYSTEMS FOR ERROR DETECTION OF DATA TRANSMISSION

(75) Inventor: Jen-De Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 967 days.

(21) Appl. No.: 12/345,278

(22) Filed: Dec. 29, 2008

(65) Prior Publication Data

US 2009/0172491 A1 Jul. 2, 2009

(30) Foreign Application Priority Data

Dec. 31, 2007 (TW) .............................. 96151680 A

(51) Int. Cl.
*H04L 1/18* (2006.01)
*H04L 1/22* (2006.01)
(52) U.S. Cl.
USPC .......................................... 714/749; 714/712
(58) Field of Classification Search .................. None
See application file for complete search history.

(56) References Cited

U.S. PATENT DOCUMENTS

| 5,432,805 | A | 7/1995 | Kikuchi et al. |
| 6,286,125 | B1 | 9/2001 | Leshay et al. |
| 6,543,014 | B1 | 4/2003 | Okuyama et al. |

FOREIGN PATENT DOCUMENTS

TW I245980 12/2005

OTHER PUBLICATIONS

Anonymous: "The I2C-bus specification Version 2.1," Philips Semiconductors, Product Specification, Jan. 1, 2000, pp. 1-46, XP002218697.

*Primary Examiner* — Ajay Bhatia
*Assistant Examiner* — Dipakkumar Gandhi
(74) *Attorney, Agent, or Firm* — Birch, Stewart, Kolasch & Birch, LLP

(57) ABSTRACT

The invention provides an error detection method for data transmission in a transmission system with a first device, a second device and a data line. The method comprises the following steps. Firstly, a clock signal is sent to synchronize the first and second devices. Secondly, at least one serial data is sent from the first device to the second device in response to the clock signal. After sending the serial data, the first device sends an acknowledgement signal to the second device. After sending the acknowledgement signal, the first device reads the data line to obtain a reading value and determines whether the serial data is correct according to the reading value and a default value of the data line.

20 Claims, 4 Drawing Sheets

METHODS AND SYSTEMS FOR ERROR DETECTION OF DATA TRANSMISSION

CROSS REFERENCE TO RELATED APPLICATIONS

This Application claims priority of Taiwan Patent Application No. 96151680, filed on Dec. 31, 2007, the entirety of which is incorporated by reference herein.

BACKGROUND OF THE INVENTION

1. Field of the Invention

The invention relates to an error detection and correction method for data transmission, and more particularly, to an error detection and correction method for data transmission applied for large amounts of serial data.

2. Description of the Related Art

Serial data transmission methods are commonly used in data transmission between two different electronic apparatuses. To transmit data between two electronic apparatuses, a clock signal line is used for synchronization and a data line is used to transmit data therebetween. Generally, there is a default value in the data line directed by the circuitry thereof for representing voltage level of the data line when no data is transmitted on the data line. In order to ensure data accuracy of data transmitted between the two electronic apparatuses, an acknowledgement signal having a value inversed to the default value is transmitted from the electronic apparatus sending the data to the electronic apparatus receiving the data when a serial data has been transmitted. The electronic apparatus receiving the data then checks the acknowledgement signal so as to determine whether the electronic apparatus sending the data has completed its transmission.

In some situations, when two apparatuses are synchronized, the electronic apparatus sending the data may lose part of the clock signal, thus delaying the transmission of signals. The electronic apparatus receiving the data, however, is not aware of the situation and thus may receive erroneous data as the acknowledgement signal. Because the electronic apparatus receiving the data may recognize the received erroneous acknowledgement signal as a correct signal, the electronic apparatus receiving the data may continually receive data from the transmitting end. The electronic apparatus receiving the data may find out that the data being received is erroneous, only after receiving a number of data segments. As a result, the entire cycle of data is required to be retransmitted.

In other words, during data transmission, if one transmission end does not receive or transmit data on a real time basis due to loss of a clock signal, thereby delaying or causing error in the data transmission, there is no effective error detection mechanism provided, which can provide real time error detection and notify the electronic apparatus sending the data to resend the serial data. Thus, an entire cycle of data is required to be resent, even if only one serial data among the entire cycle of data is erroneous, reducing transmission performance.

SUMMARY

In one embodiment of the invention, an error detection method for data transmission in a transmission system with a first device, a second device and a data line is provided. The method comprises the steps of: sending a clock signal to synchronize the first and second devices; sending at least one serial data from the first device to the second device in response to the clock signal; sending an acknowledgement signal to the second device by the first device after sending the serial data; and reading the data line to obtain a reading value and determining whether the serial data is correct according to the reading value and a default value of the data line after sending the acknowledgement signal by the first device.

In another embodiment of the invention, a data transmission system is provided. The data transmission system comprises a first device, a second device and a data line. The data line has a default value and is configured for transmitting a bitstream between the first and second devices. The bitstream at least comprises a first segment having at least m bits for representing a start address and a plurality of second segments following the first segment, wherein each of the second segments comprise a serial data, an acknowledgement signal and a detection signal with at least one bit. After sending the serial data and the acknowledgement signal of one of the second segments, the first device reads the data line to obtain the detection signal and determine whether the serial data is correct according to the detection signal and the default value of the data line.

In yet another embodiment of the invention, an error detection method for data transmission in a data transmission system with a first device, a second device and a data line is provided. The method comprises the steps of: sending a clock signal to synchronize the first and second devices; receiving at least one serial data by the first device in response to the clock signal; receiving an acknowledgement signal by the first device after receiving the serial data; and after receiving the acknowledgement signal, reading the data line by the first device to obtain a reading value and determining whether the serial data is correct according to the reading value and a default value of the data line.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides an error detection method for data transmission in a data transmission system with a first device, a second device and a data line.

Figure 1:
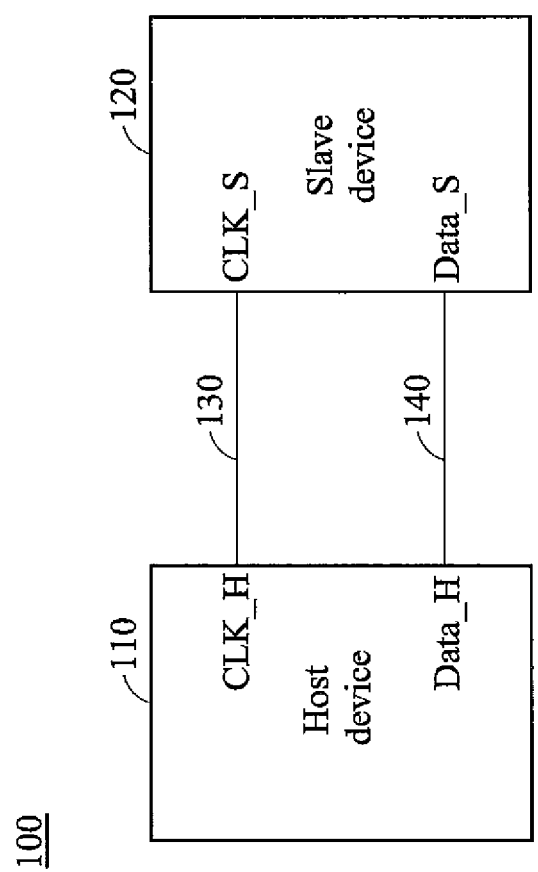
FIG. 1 shows an embodiment of a data transmission system according to the invention.

FIG. 1 shows an embodiment of a data transmission system for transmitting serial data according to the invention. The data transmission system 100 comprises a Host device 110, a Slave device 120, a clock signal line 130 and a data line 140. The clock signal line 130 is coupled to the clock output end CLK_H of the host device 110 and the clock input end CLK_S of the slave device 120. The data line 140 is coupled to the data output end Data_H of the host device 110 and the data output end Data_S of the slave device 120, and has a default value which may be 0 or 1. The host device 110 sends a clock signal to the slave device 120 via the clock signal line 130 such that data transmission between the host device 110 and the slave device 120 can be synchronized. After the host device 110 and the slave device 120 are synchronized, the host device 110 transmits a bitstream to the slave device 120 through the data line 140 for data transmission therebetween.

Traditionally, during transmissions, before the host device 110 reads data on the slave device 120, the host device 110 must first send a reading address and a read command to the slave device 120. Then, after receiving the reading address and read command, the slave device 120 replies a data and an acknowledgement signal ACK to the host device 110. Only after receiving the replied acknowledgement signal ACK, can the host device 110 then send a next reading address and a read command for reading the next data. In this embodiment, however, the slave device 120 is capable of sending a cycle of data blocks to the host device 110 to improve the processing speed of the data transmission.

Figure 2:
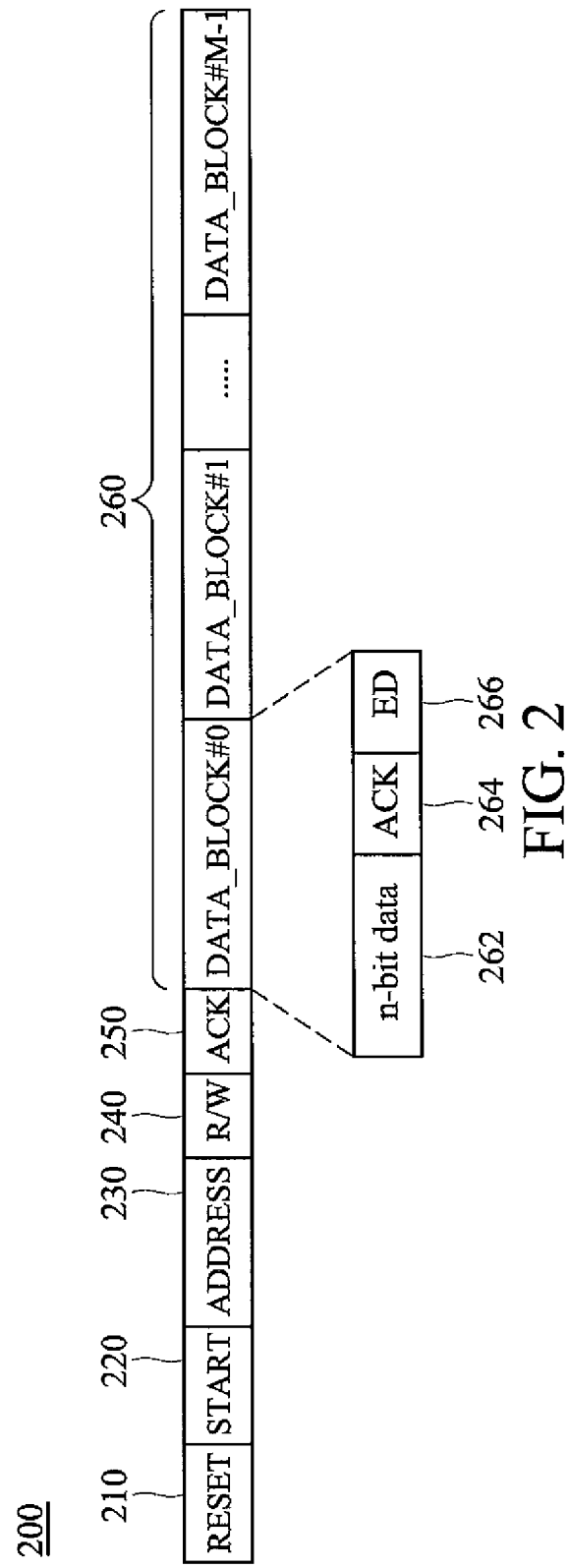
FIG. 2 is a schematic view showing a data format of a bitstream applied in an embodiment of a data transmission method according to the invention.

FIG. 2 is a schematic view showing a data format of a bitstream applied in an embodiment of a data transmission method according to the invention. In this embodiment, the data format of the bitstream is utilized for illustrating the data format utilized for the transmission between the host device 110 and the slave device 120. As shown in FIG. 2, the bitstream 200 comprises a plurality of segments or data fields, such as a first segment 210, a second segment 220, a third segment 230, a fourth segment 240, a fifth segment 250 and a data segment 260. The segments 210 to 240 are generated by the host device 110 while the segments 250 and 260 are generated by the slave device 120. The first segment 210 includes at least one bit that serves as a reset signal RESET for resetting a data transmission cycle. The second segment 220 includes at least one bit that serves as a start signal START for restarting a data transmission cycle. The third segment 230 includes at least m bits that comprise address information for indicating the start address of the memory storing the data blocks of the data segment 260. In this embodiment, the start address of the memory may be a start address of a storage device within the slave device 120 for storing data that will be written from the host device 110 to the slave device 120, or an address of a storage device within the host device 110 for storing data that will be written to the slave device 120.

The fourth segment 240 includes at least one bit that serves as a read/write (R/W) signal which indicates that the host device 110 will perform a reading operation or a writing operation to the slave device 120. Note that the fourth segment 240 may also utilize multiple bits which indicate different reading or writing operations between the host device 110 and the slave device 120. The fifth segment 250 includes at least one bit, which is sent by the slave device 120 and serves as an acknowledge signal. When receiving a read/write command and a related start address sent by the host device 110, the slave device 120 replies with an acknowledgement signal to the host device 110 to notify the host device 110 that it has already received the read/write command and related start address. In this embodiment, the logical voltage level of the bit of the acknowledgement signal may be "1" or "0". The data segment 260 includes a plurality of (e.g. M) data blocks DATA_BLOCK#0 to DATA_BLOCK#M−1 which represent a cycle of data blocks in which each data block comprises an n-bit serial data 262, an acknowledgement signal (ACK) 264 and at least one detection signal (ED) 266. The n-bit serial data 262 includes data to be transmitted or received, and the acknowledgement signal (ACK) 264 is sent by the slave device 120 after one n-bit serial data has been sent to notify the host device 110 that the n-bit serial data has already been sent. The detection signal 266 includes at least one detection bit for detecting whether any error has occurred in the transmitted or received data. The value of the detection bit of the detection signal 266 is a reading value obtained from the data line 140 after signals have been received or transmitted. In this embodiment, the detection bit of the detection signal 266 is one bit for detecting data with one bit error. It is to be understood that the detection bit may be more than one bit for detecting data with more than one bit error.

Figure 3:
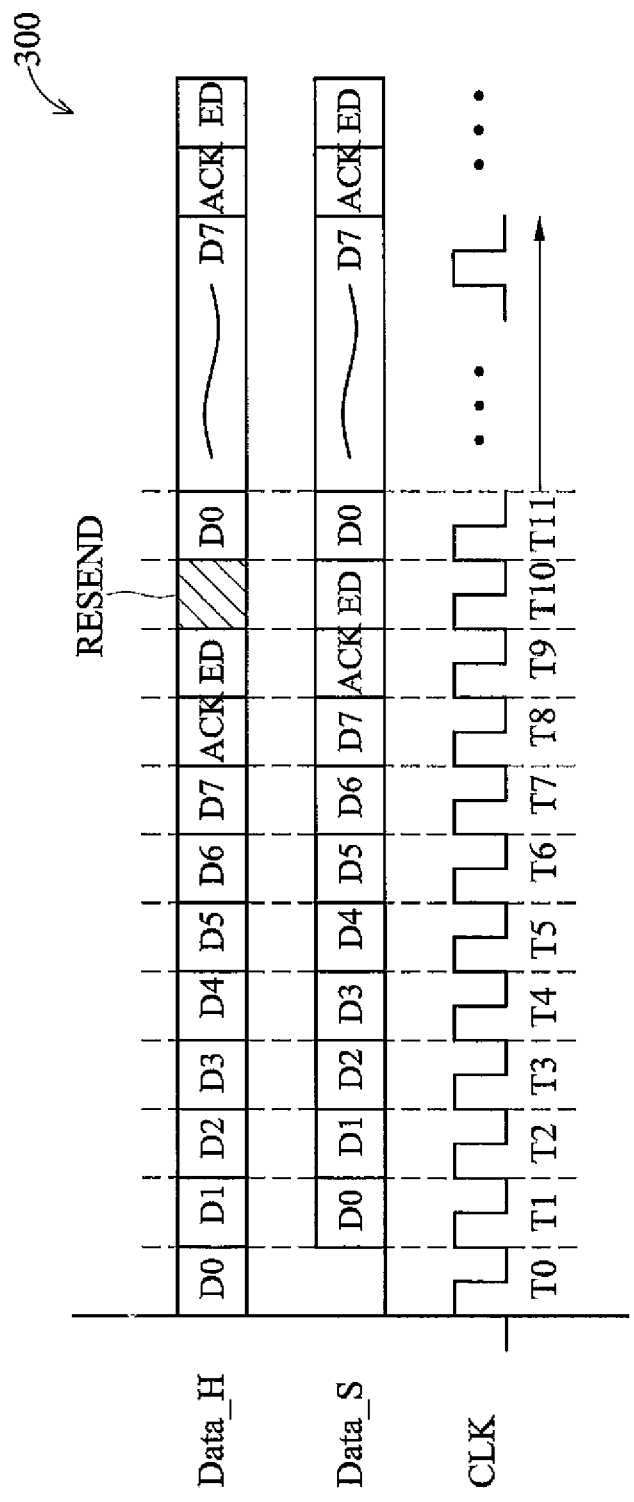
FIG. 3 shows an exemplary error detection and process procedure for data transmission according to one embodiment of the invention.

FIG. 3 shows an exemplary error detection and process procedure for data transmission according to one embodiment of the invention. As shown in FIG. 3, a clock signal in the clock signal line and a data transmission timing on the data lines of the slave device 120 and the host device 110 are respectively represented by CLK, Data_S and Data_H in which the default value, i.e. voltage level, of the data line 140 is set to "0". The default value of the data line 140 may be, in another embodiment, set to "1". In this embodiment, it is assumed that each data block of the serial data includes 8-bits data, and the host device 110 is receiving the data block DATA_BLOCK#n (where n<M−1), which has data D0-D7, from the slave device 120. Note that although the length of each data block includes 8-bits data, it's not limited thereto. For example, the length of each data block may include 16 bits or any arbitrary number of bits.

Referring to FIG. 3, it is assumed that the host device 110 and the slave device 120 are synchronized at time T0. Meanwhile, the host device 110 begins to receive data D0 from the slave device 120. However, if there is a delay or error during data transmission, the slave device 120 does not receive the clock signal generated at time T0 so that the data D0 is sent at time T1 rather than time T0. Accordingly, the data D0 sent by the slave device 120 will be received and recognized as data D1 by the host device 110. Meanwhile, the host device 110 may determine that data D0-D7 from the slave device 120 have been completely received throughout time periods T0 to T7 and recognizes the data received at time T8 as the acknowledgement signal ACK. Note that, however, data sent by the slave device 120 at time T8 is data D7. In other words, the host device 110 will regard data D7 as the acknowledgement signal ACK.

Accordingly, at time T9, the real acknowledgement signal ACK which has a value "1", inversed to the default value "0", is sent by the slave device 120. Meanwhile, since the acknowledgement signal represented by the received data D7 has already been received, the host device 110 reads the data line 140 to obtain the value of the acknowledgement signal ACK ("1"), sent by the slave device 120, as a reading value ED of the data line 140. Thereafter, the host device 110 will determine whether the received data is correct according to the received acknowledgement signal ACK (actually the data D7) and the reading value ED (actually the acknowledgement signal ACK). Possible situations are listed below.

(1) If the value of the acknowledgement signal ACK is "1" and the reading value ED is "0", the received data D0-D7 are recognized as correct data and thus the next data block DATA_BLOCK#n+1 will be processed.

(2) If the reading value ED is "1", the received data D0-D7 are recognized as incorrect data, in spite of whether the value of the acknowledgement signal ACK is "1" or "0". That is, one bit error has been found. Therefore, the host 110 may determine whether to request the slave device 120 to re-send the data block DATA_BLOCK#n. If the host device 110 does not request the slave device 120 to resend the data block DATA_BLOCK#n, the host device 110 will further send a signal with a value, which is the same as the default value (i.e. "0"), at time T10 to notify the slave device 120 to continue to send the next data block DATA_BLOCK#n+1.

If the host device 110 requests the slave device 120 to resend the data block DATA_BLOCK#n, the host device 110 will further send a retransmission signal RESEND with a value "1" to notify the slave device 120 that the received data is incorrect. At time T10, the slave device 120 has already sent the acknowledgement signal ACK and begins to read the data line 140 in order to obtain a reading value ED. However, since the retransmission signal RESEND is represented on the data line 140, it is read and recognized as the reading value ED by the slave device 120 at time T10. Once the slave device 120 realizes that the reading value is "1" which is not the default value "0", it will know that there is an error in the data transmitted to the host device 110. Thus, the data block DATA_BLOCK#n will be immediately resent at a next time point T11. In other words, the host device 110 is capable of notifying the slave device 120, that an error has occurred during data transmission, and requesting the slave device 120 to resend the data using this retransmission signal RESEND.

(3) If the value of the acknowledgement signal ACK is "0" and the reading value ED is "0", the received data D0-D7 are recognized as incorrect data and having more than one bit error. Under this format, this kind of error is unrecoverable thereby the entire data segment will be required to be resent. Therefore, the host device 110 has to send a command of resending the entire data segment to inform the slave device 120 to resend the data from data block DATA_BLOCK#0. For example, the host device 110 may direct the slave device 120 to resend data segment of the $m^{th}$ cycle by sending a command format, which includes a reset signal, a start signal, start address and read/write signal, to the slave device 120.

In addition to detecting error during the period of time when the host device 110 is reading data from the slave device 120, embodiments of the invention may also be used in detect error during the period of time when the host device 110 is writing data to the slave device 120. Please refer to FIG. 4.

Figure 4:
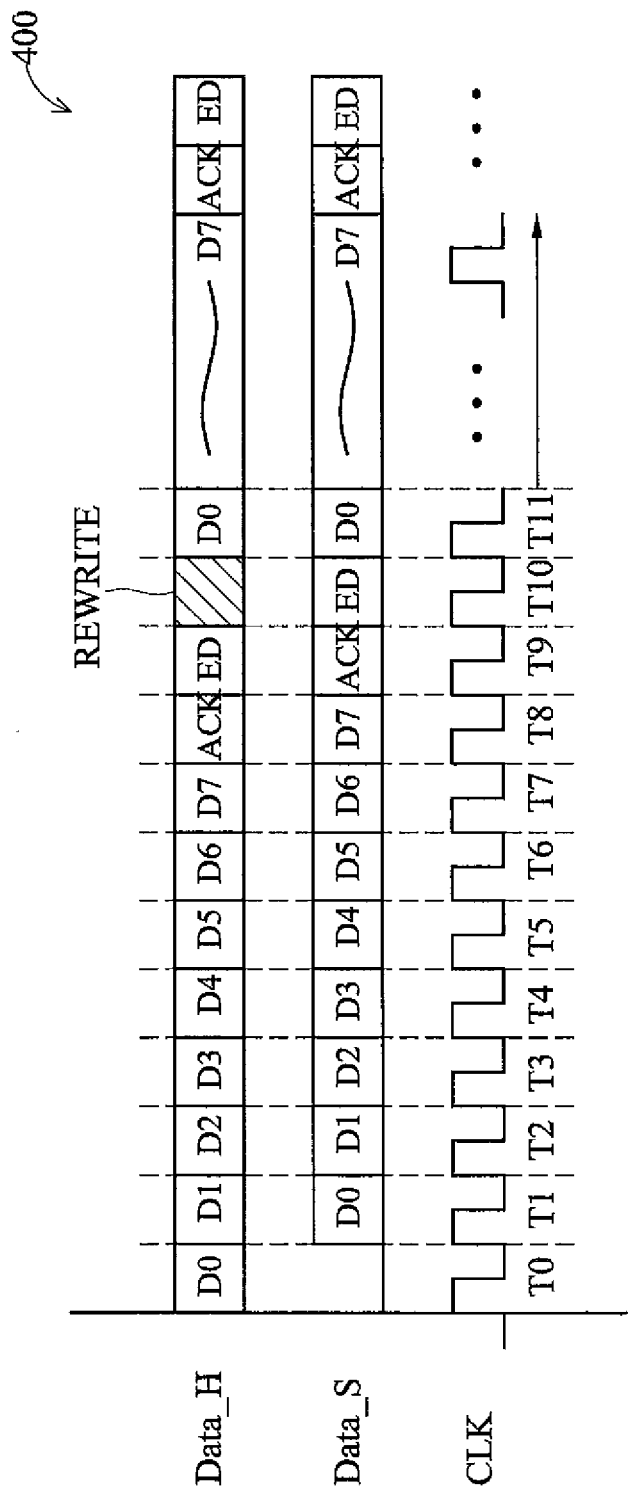
FIG. 4 shows an exemplary error detection and process procedure for data transmission according to another embodiment of the invention.

FIG. 4 shows an exemplary error detection and process procedure for data transmission according to another embodiment of the invention. Similarly, as shown in FIG. 4, clock signal in the clock signal line and data transmission timing on the data lines of the slave device 120 and the host device 110 are respectively represented by CLK, Data_S and Data_H in which the default value, i.e. voltage level, of the data line 140 is set to "0". The default value of the data line 140 may be, in another embodiment, set to "1". In this embodiment, it is assumed that each data block of the serial data includes 8-bits data.

Referring to FIG. 4, it is assumed that the host device 110 and the slave device 120 are synchronized at time T0 and the host device 110 begins to send data D0 to the slave device 120. However, due to delay or error during data transmission, the slave device 120 does not receive the clock signal generated at time T0 so that the data D0 sent by the host device 110 is received at time T1 rather than time T0. Accordingly, the data D1 sent by the host device 110 will be received and recognized as data D0 by the slave device 120. Therefore, the slave device 120 may determine that the data D0-D7 from the host device 110 have been completely received throughout the time periods T1 to T8, thereby sending an acknowledgement signal ACK having a value "1" at time T9.

Meanwhile, since the host device 110 has sent the acknowledgement signal ACK at time T8, it reads the data line 140 to obtain the value of the acknowledgement signal ACK ("1"), sent by the slave device 120, as a reading value ED of the data line 140 at time T9. Thereafter, the host device 110 will determine whether the data received from the slave device 120 is correct according to the reading value ED. Possible situations are listed below.

(1) If the value of the acknowledgement signal ACK is "1" and the reading value ED is "0", the received data D0-D7 are recognized as correct data and thus the next data block DATA_BLOCK#n+1 will be processed.

(2) If the reading value ED is "1", the received data D0-D7 are recognized as incorrect data, in spite of whether the value of the acknowledgement signal ACK is "1" or "0". That is, one bit error has been found. Therefore, the host 110 may determine whether to request the slave device 120 to rewrite the data block DATA_BLOCK#n. If the host device 110 requests the slave device 120 to rewrite the data block DATA_BLOCK#n, the host device 110 will further send a rewrite signal REWRITE with a value "1" to notify the slave device 120 that the received data is incorrect at time T10. At the same time, the slave device 120 has already sent the acknowledgement signal ACK and begins to read the data line 140 in order to obtain a reading value ED. However, since the rewrite signal REWRITE is represented on the data line 140, it is read and recognized as the reading value ED by the slave device 120 at time T10. Once the slave device 120 realizes that the reading value is "1" which is not the default value "0", it will know that there is an error in the data received from the host device 110. Thus, the slave device 120 will receive the data block DATA_BLOCK#n again at a next time point T11. In other words, the host device 110 is capable of notifying the slave device 120 that error occurred during data transmission and requesting the slave device 120 to receive the data again using the rewrite signal REWRITE.

(3) If the value of the acknowledgement signal ACK is "0" and the reading value ED is "0", the received data D0-D7 are recognized as incorrect data and having more than one bit error. Under this format, this kind of error is unrecoverable thereby the entire data segment will be required to be rewritten. Therefore, the host device 110 has to send a command of rewriting the entire data segment to inform the slave device 120 to start rewriting the data from data block DATA_BLOCK#0. For example, the host device 110 may direct the slave device 120 to start rewriting data segment of the $m^{th}$ cycle by sending a command format, which includes a reset signal, a start signal, start address and read/write signal, to the slave device 120.

According to the error detection method of the invention, by utilizing the detection bit ED within the detection signal following the acknowledgement signal ACK, the data block having errors can be detected on a real time basis and be immediately retransmitted without retransmitting data of the entire cycle. Thus, the error detection method of the invention not only provides a mechanism for real time error detection and retransmission but also improves transmission efficiency.

It is to be noted that although one bit error detection is illustrated in the embodiment, the invention may also be applied to n bits error detection. For example, in another embodiment, two bit errors can be detected by utilizing two bits ED within the detection signal.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. An error detection method for data transmission in a transmission system with a first device, a second device and a data line, comprising:
   sending a clock signal to synchronize the first and second devices;
   sending at least one serial data from the first device to the second device in response to the clock signal, wherein the data line has a default logical value when no data is transmitted on the data line;
   sending an acknowledgement signal to the second device by the first device after sending the serial data;
   reading the data line to obtain a reading value and determining whether the serial data is correct according to the reading value and the default logical value of the data line after sending the acknowledgement signal by the first device;
   determining that the serial data is correct when the reading value is the same as the default logical value of the data line; and
   determining that the serial data is incorrect when the reading value is inversed to the default logical value of the data line.

2. The error detection method as claimed in claim 1, wherein the step of determining that the serial data is correct when the reading value is the same as the default logical value of the data line further comprises:
   transmitting a next serial data when determining that the serial data is correct.

3. The error detection method as claimed in claim 1, wherein the step of determining that the serial data is incorrect when the reading value is inversed to the default logical value of the data line further comprises:
   determining whether to request to rewrite the serial data when determining that the serial data is incorrect.

4. The error detection method as claimed in claim 3, further comprising:
   sending a rewriting signal to notify the second device to once again receive the serial data.

5. The error detection method as claimed in claim 4, further comprising:
   receiving the serial data again when the second device receives the rewriting signal.

6. The error detection method as claimed in claim 4, wherein a value corresponding to the rewriting signal is not equal to the default logical value.

7. The error detection method as claimed in claim 1, wherein a value corresponding to the acknowledgement signal is inversed to the default logical value.

8. A data transmission system, comprising:
   a first device and a second device;
   a data line having a default logical value when no data is transmitted on the data line and being configured for transmitting a bitstream between the first and second devices, and the bitstream at least comprising:
   a first segment having at least m bits for representing a start address; and
   a plurality of second segments following the first segment, wherein each of the second segments comprises a serial data, an acknowledgement signal and a detection signal with at least one bit,
   wherein after sending the serial data and the acknowledgement signal of one of the second segments, the first device reads the data line to obtain the detection signal and determines whether the serial data is correct according to the detection signal and the default logical value of the data line;
   when a value corresponding to the detection signal is the same as the default logical value of the data line, the first device determines that the serial data is correct; and
   when the value corresponding to the detection signal is inversed to the default logical value of the data line, the first device determines that the serial data is incorrect.

9. The data transmission system as claimed in claim 8, further comprising a clock signal line coupled to the first and second devices for transmitting a clock signal to synchronize the first and second devices.

10. The data transmission system as claimed in claim 8, wherein the first device further transmits a next serial data to the second device when determining that the serial data is correct.

11. The data transmission system as claimed in claim 8, wherein the first device further determines whether to request the second device to once again receive the serial data when determining that the serial data is incorrect.

12. The data transmission system as claimed in claim 11, wherein the first device further sends a rewriting signal to notify the second device to once again receive the serial data, and the second device once again receives the serial data when receiving the rewriting signal.

13. The data transmission system as claimed in claim 8, wherein the bitstream further comprises a third segment located between the first and second segments, and the third segment includes at least one bit for representing read/write statuses.

14. An error detection method for data transmission in a data transmission system with a first device, a second device and a data line having a default logical value when no data is transmitted on the data line, comprising:
   sending a clock signal to synchronize the first and second devices;
   receiving at least one serial data by the first device in response to the clock signal;
   receiving an acknowledgement signal by the first device after receiving the serial data;
   after receiving the acknowledgement signal, reading the data line by the first device to obtain a reading value and determining whether the serial data is correct according to the reading value and the default logical value of the data line;
   determining that the serial data is correct when the reading value is the same as the default logical value of the data line; and
   determining that the serial data is incorrect when the reading value is inversed to the default logical value of the data line.

15. The error detection method as claimed in claim 14, further comprising:
   transmitting a next serial data when determining that the serial data is correct.

16. The error detection method as claimed in claim 14, further comprising:
   determining whether to request to retransmit the serial data when determining that the serial data is incorrect.

17. The error detection method as claimed in claim 16, further comprising:
   sending a retransmission signal to notify the second device to once again retransmit the serial data; and
   retransmitting the serial data when the second device receives the retransmission signal.

18. The error detection method as claimed in claim 17, wherein the value of the retransmission signal is not equal to the default logical value.

19. The error detection method as claimed in claim 14, wherein the value of the acknowledgement signal is inversed to the default logical value.

20. The error detection method as claimed in claim 14, wherein the default logical value is 0 or 1.

* * * * *